Inventor.
Charles A. Siler.
By [signature]
Attorney.

United States Patent Office 3,181,385
Patented May 4, 1965

3,181,385
POWER TRANSMISSION
Charles A. Siler, Racine, Wis., assignor to Twin Disc Clutch Company, Racine, Wis., a corporation of Wisconsin
Filed Oct. 5, 1962, Ser. No. 228,577
12 Claims. (Cl. 74—364)

My invention relates to power transmissions and more particularly to those incorporating hydraulically actuated, friction plate clutches selectively controlled for determining a direction drive and other similar clutches selectively engageable to determine variant speeds of the output shaft.

The improved transmission is specially intended for use with heavy duty vehicles, both wheeled and tracked. A prime consideration in the operation of hydraulically operated, friction plate clutches is the securing of their engagement with a minimum of shock or jerk and this factor is particularly important in a multispeed power train of the present type.

It is therefore one object of the invention to provide a power train including hydraulically actuated, friction plate clutches for respectively determining direction movements and specifically forward and reverse drives and a plurality of like clutches selectively controlled to determine different speeds of the transmission output shaft and in which provision is made to release the pressure to the forward or reverse clutch whenever a selection change is made from one speed range to another.

A further object is to devise a transmission of the character indicated having means for controlling the rate of pressure rise for the selected direction and speed range clutches from release to maximum torque transmitting condition and in which pressure rise for the direction clutch is delayed until after the pressure for the selected speed range clutches reaches a determined and less than maximum value.

In the drawings:

FIG. 4 is a reduced, schematic view showing actual gear relations in and as viewed in the direction of the arrow 4 in FIG. 1, certain of the gears in the latter figure being displaced for clearness.

For purpose of disclosure, the invention is shown applied to a four-speed transmission with capability for forward and reverse drives, but the number of speeds is not important as long as there are at least two in relation to at least one direction clutch.

Figure 1:
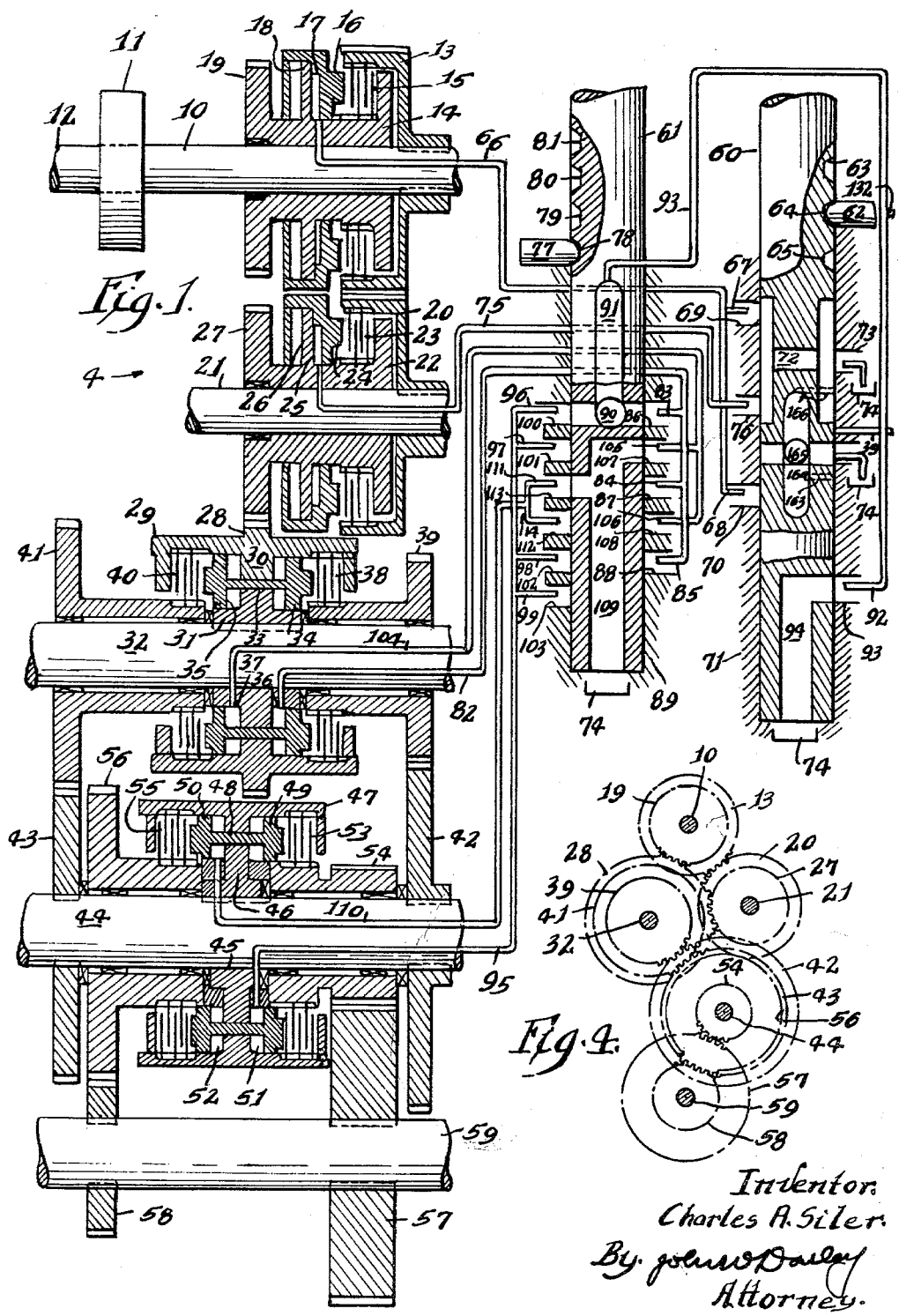
FIG. 1 is a schematic, sectional elevation of a four-speed, power transmission and selector valves for respectively determining the engagement of master clutches, such as those for forward or reverse drive, and the engagement of other clutches for varying speed ratios through the transmission, all clutches being released with the power source operating.

Referring to FIG. 1, the numeral 10 designates an input shaft for the transmission which connects through an hydraulic torque converter 11 with a shaft 12 driven by a conventional power source (not shown). The shaft 10 is fast to a gear 13 that is internally conditioned to drive a hub 14 mounted on the shaft 10 by means of an hydraulically actuated, friction plate clutch 15. The clutch 15 is engaged by an annular piston 16 which is actuated by a pressure liquid supplied to an annular cylinder 17 in the manner presently described and which cylinder is included between the hub 14, piston 16 and a fixed annular abutment 18 carried by the hub 14. The clutch 15 constitutes a master input clutch and when engaged drives a gear 19 mounted on the hub 14 to determine forward motion at any selected speed of the transmission.

The gear 13 is in constant mesh with a like shaped gear 20 which is keyed to an input shaft 21 on which is mounted a hub 22 and driving connection between the hub 22 and gear 20 is by means of an hydraulically actuated, friction plate clutch 23. Actuation of the latter clutch is effected by an annular piston 24 when moved by pressure liquid supplied to an annular cylinder 25 included between the hub 22, piston 24 and a fixed, annular abutment 26 carried by the hub 22. The clutch 23 also constitutes a master input clutch and when engaged drives a gear 27 mounted on the hub 22 to determine reverse motion at any selected speed of the transmission.

The gear 27 constantly meshes with a gear 28 provided on the outer periphery of a cylindrical shell 29 which intermediate its ends and internally thereof connects through a fixed, annular abutment 30 with a hub 31 carried by a first intermediate shaft 32, the latter, the hub 31 and shell 29 being coaxial. A plurality of rods 33 are slidable through and transversely of the abutment 30 and carry on opposite ends thereof, respectively, annular pistons 34 and 35 which are slidable in annular cylinders 36 and 37 positioned on opposite sides of the abutment 30, respectively. The cylinders 36 and 37 are selectively supplied, as presently described, with pressure liquid and when the assembly including the pistons 34 and 35 is moved to the right, as viewed in FIG. 1, and provided that either the forward clutch 15 or the reverse clutch 23 is engaged, the gear 28 is drivably connected through a friction plate clutch 38 with a gear 39 journaled on the shaft 32. Under the same conditions, when the indicated assembly is moved to the left in the same figure, the gear 28 is drivably connected through a friction plate clutch 40 with a gear 41 journaled on the shaft 32.

FIG. 1 specifically shows how driving connection between the gears 27 and 28 is secured when the reverse clutch 23 is engaged, but it will be understood from FIG. 4 that when the forward clutch 15 is engaged, the gear 19 also has driving connection with the gear 28, the latter gear constantly meshing with the gears 19 and 27.

The gears 39 and 41 constantly mesh, respectively, with gears 42 and 43 which are splined to a second intermediate shaft 44. Positioned between the gears 42 and 43 and mounted on the shaft 44 is a hub 45 having an annular, fixed abutment 46 which carries a cylindrical shell 47 that is coaxial with the shaft 44. A plurality of rods 48 are slidable through and transversely of the abutment 46 and carry on opposite ends thereof annular pistons 49 and 50 which are slidable in annular cylinders 51 and 52 positioned on opposite sides of the abutment 46, all respectively. When the cylinder 51 is supplied with pressure liquid, the piston 49 is moved to the right, as viewed in FIG. 1, and engages a friction plate clutch 53 to establish a driving connection between the gear 42 and a gear 54 journaled on the shaft 44 and when the cylinder 52 is similarly supplied, the piston 50 is moved to the left in the same figure and engages a friction plate clutch 55 to establish a driving connection between the gear 43 and a gear 56. The gears 54 and 56 constantly mesh, respectively, with gears 57 and 58 splined to an output or load shaft 59.

The relation of the several gear trains is such that, with either the forward clutch 15 or the reverse clutch 23 engaged, the engagement of clutches 38 and 53, 40 and 53, 38 and 55, and 40 and 55 determine first, second, third and fourth speeds of the transmission, respectively. So far as described, the structure is generally conventional including the facility in the clutches 38, 40, 53 and 55, hereinafter referred to as gear train clutches, of releasing one clutch in each associated pair when the other clutch thereof is engaged.

The admission and release of pressure liquid to and from the forward and reverse clutches 15 and 23, respectively, and including a neutral position, is determined by a direction, selector valve stem 60 and control on the pressure liquid to the gear train clutches 38, 40, 53 and 55 is generally determined by a range, selector valve stem 61. As more fully described hereinafter, the valves 60 and 61 are related to the several clutches and each other and in conjunction with other presently described devices so that, assuming an engagement of the forward clutch 15 and an engagement of an appropriate pair of the gear train clutches, dependent upon the selected gear ratio, a release of the forward clutch will also release the gear train clutches then engaged. Further, under the same assumed conditions, if a speed shift is made by a selection of a different pair of gear train clutches, all clutches then engaged are released for a purpose presently explained. The same considerations also apply to the reverse clutch 23.

The direction valve stem 60 is conditioned for three positions by means of a conventional releasable detent 62 which is selectively engageable with notches 63, 64 and 65 in the direction stem 60 for respectively determining the engagement of the forward clutch 15, a release of the forward and reverse clutches 15 and 23, respectively, and an engagement of the reverse clutch 23, the simultaneous release of these clutches being shown in FIG. 1 which establishes the neutral of the transmission.

In the position of the detent 62 shown, the forward clutch cylinder 17 connects with one end of a pipe 66 whose opposite end includes branches 67 and 68 which respectively communicate with ports 69 and 70 provided in the casing 71 of the direction stem 60. In the shown position of the direction stem 60, the port 69 connects successively through an H-shaped passage 72 in the direction stem 60 and a port 73 in the stem casing 71 with a sump 74 so that pressure does not exist in the forward clutch cylinder 17 and the associated clutch 15 is released.

For the reverse clutch 23 and with the direction stem 60 in the neutral position shown, the reverse cylinder 25 communicates successively through a pipe 75, a port 76 in the stem casing 71, the H-shaped passage 72 and port 73 with the sump 74 so that the reverse clutch 23 stands released.

The range valve stem 61 is conditioned for four positions by means of a conventional, releasable detent 77 which is selectively engageable with notches 78, 79, 80 and 81 in the range stem 61 for respectively determining first, second, third and fourth speeds in the transmission when either the forward clutch 15 or the reverse clutch 23 is engaged. While the detent 77 is shown in first speed position in FIG. 1, none of the gear train clutches is engaged as will now be described.

The clutch cylinder 36 connects with one end of a pipe 82 whose opposite end includes branches 83, 84 and 85 which respectively communicate with ports 86, 87 and 88 provided in the casing 89 of the range stem 61. In the FIG. 1 position of the range stem 61, the ports 87 and 88 are masked, but the port 86 registers with radial passages 90 which communicate successively through a channel passage 91 in the range stem 91 and a pipe 92 with a port 93 in the direction stem casing 71 and, in the FIG. 1 position of the direction stem 60, the port 93 connects through a passage 94 in the latter stem with the sump 74. Accordingly, the gear train clutch cylinder 36 is devoid of pressure and the associated clutch 38 is released.

The clutch cylinder 51 connects with one end of a pipe 95 whose opposite end includes branches 96, 97, 98 and 99 which respectively communicate with ports 100, 101, 102 and 103 in the range stem casing 89. In the FIG. 1 position of the range stem 61, the ports 101, 102 and 103 are masked, but the port 100 registers with the radial passages 90 to thereby establish communication with the sump 74 by way of the pipe 92 and passage 94 as described above. The clutch cylinder 51 is therefore free of pressure and the clutch 53 is released.

It will be apparent from the foregoing that, notwithstanding the shown first speed position of the range stem 61, the first speed clutches 38 and 53 are released when the direction stem 60 is in neutral position.

The clutch cylinder 37 connects with one end of a pipe 104 whose opposite end includes branches 105 and 106 which respectively communicate with ports 107 and 108 provided in the range stem casing 89. In the FIG. 1 position, the port 108 is masked, but the port 107 connects through a passage 109 in the range stem casing 89 with the sump 74 so the clutch 40 stands released.

The clutch cylinder 52 connects with one end of a pipe 110 whose opposite end includes branches 111 and 112 which respectively communicate with ports 113 and 114 provided in the range stem casing 89. In the FIG. 1 position, the port 114 is masked, but the port 113 connects with the passage 109 and hence with the sump 74 so the clutch 55 is released.

Figure 2:
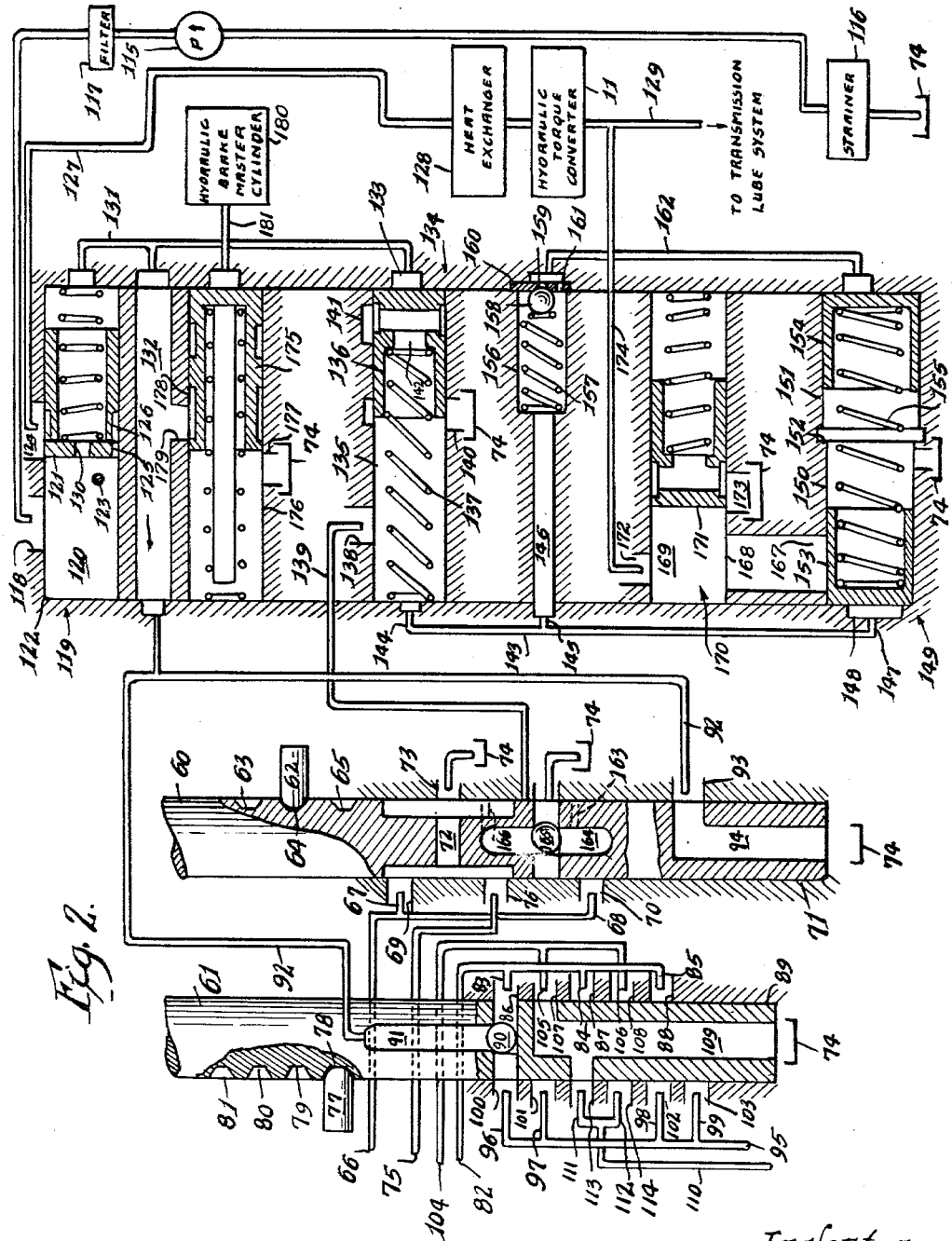
FIG. 2 is a schematic, sectional elevation showing the selector valves as they appear in FIG. 1 and in relation to a hydraulic system including pressure regulating valves for controlling pressure for the several hydraulically actuated clutches, the several parts being shown in positions determining release of all clutches as in FIG. 1.

As noted above, it is important in the operation of hydraulically actuated, friction plate clutches that they be engaged without appreciable shock or jerk and the problem is accentuated in a multi-clutch power train such as disclosed. Important features of this invention are controlling the pressure rise for the selected direction clutch and the selected gear train clutches when a speed change is made in the transmission, a release of the pressure for the direction clutch then engaged when a speed change is made, an attainment of a predetermined, less than maximum pressure for the gear train clutches associated with the latter change before the beginning of the pressure rise for the direction clutch, and maintaining a higher maximum pressure for the engaged, gear train clutches than for the direction clutch when engaged. The foregoing results are obtained by associating the several clutches, direction and range stems shown in FIG. 1 with a hydraulic system including the hydraulic torque converter 11 and a plurality of pressure regulating valves as shown in FIG. 2. In the latter figure, the direction stem 60 and the range stem 61 occupy the same positions as in FIG. 1 and, for purpose of drawing disclosure, these stems provide the link between FIGS. 1 and 2.

Referring to the latter figure, a suitably driven pump 115 withdraws the working liquid, usually a suitable oil and so referred to hereinafter, from the sump 74 through a conventional strainer 116 and delivers the same through a conventional filter 117 to an inlet port 118 forming part of a flow divider 119 including a cylinder 120 and a spring loaded piston 121 movable therein. The flow divider 119 is mounted in a casing 122 which is common to a plurality of other valves as presently described. Since FIG. 2 assumes the vehicle to be at rest, engine running, oil entering the cylinder 120 shifts the piston 121 towards the right away from the stop pin 123 to partly uncover an outlet port 124. Additional flow to the latter port may be provided by a passage 125 in the head of the piston 121 and a connecting, annular passage 126 in the skirt of the piston 121. Oil thus delivered to the outlet port 124 flows successively through a pipe 127, a heat exchanger 128, the hydraulic torque converter 11 and a pipe 129 leading to the lubrication system (not shown) of the transmission. Provision is made as hereinafter described to maintain a conventional, basic working pressure on the oil in the converter 11 under steady running conditions.

The remaining oil passes through a passage 130 in the head of the piston 121 for delivery to a manifold pipe 131, one branch of which connects through a passage 132 in the casing 122 with the pipe 92 for supplying on demand pressure oil to the selected gear train clutches and the other branch delivers oil to the inlet port 133 of a pressure regulating valve 134 including a cylinder 135 in the casing 122 and a piston 136 movable therein and loaded by a spring 137. An outlet port 138 connects the cylinder 135 through a pipe 139 with the casing 71 of the direction stem 60 for supplying pressure oil to the selected direction clutch as presently described. In the FIG. 2 position, the piston 136 is held by the spring 137 so that the head of the piston masks the inlet port 133 and the piston skirt at least partially unmasks a port 140 connecting the cylinder 135 with the sump 74. When the piston 136 is moved by pressure towards the left as described hereinafter for FIG. 3, communication is established between the inlet port 133 and the cylinder 135 through a longitudinal passage 141 in the casing 122 and a connected T-shaped passage 142 in the head of the piston 136, and the sump port 140 is masked by the piston 136.

A manifold pipe 143 has one branch 144 connecting with the cylinder 135 on the spring side of the piston 136, another branch 145 connecting with a passage 146 in the casing 122, and another branch 147 connecting with the inlet port 148 of a pressure regulating valve 149. The latter valve includes coaxial, freely communicating cylinders 150 and 151 in the casing 122, the former having a smaller diameter than the latter, and their junction defining an annular shoulder 152, and movable in these cylinders, respectively, are pistons 153 and 154 which are loaded by a spring 155 extending therebetween. The passage 146 connects with a chamber 156 in which is positioned a spring 157 that biases a ball valve 158 in closing relation to a port 159 provided in a fixed plate 160 that additionally includes a throttling orifice 161. The port 159, when open, and the orifice 161 always communicates with one end of a pipe 162 whose opposite end communicates with the pressure regulating valve 149 at the end opposite to the inlet port 148 and at a point for delivering pressure when present to the head of the piston 154.

With zero pressure in the pipes 143 and 162, which is the FIG. 2 condition, the spring 155 maintains the pistons 153 and 154 in their maximum spaced relation and abutting, respectively, walls of the casing 122, the piston 153 then masking the inlet port 148. When pressure is supplied to the pipes 143 and 162 under conditions presently noted, the piston 153 begins moving towards the right in the characteristic regulating valve manner against the loading of the spring 155 and against the additional loading imposed on the piston 153 by the pressure in the pipe 162. This arrangement not only regulates the oil pressure between a relatively low value when the clutches are released and a maximum value when the selected clutches are fully engaged, but also by means of the throttling orifice 161 precise control is exercised on the rate of pressure rise to maximum value. The clutches are accordingly engaged without appreciable shock or jerk.

The relationship of the pressure regulating valve 149, ball valve 158, port 159 and throttling orifice 161 to the several clutches is the same as that disclosed in U.S. Letters Patent No. 3,042,165, dated July 3, 1962, to which reference may be made for further details.

With parts in the positions shown in FIGS. 1 and 2, the vehicle is stationary with the engine running. The cylinders of the several clutches are connected to the sump 74 as described above and while the hydraulic torque converter 11 is maintained full of oil due to flow through the pipe 127, the remaining oil passing through the flow divider 119 flows successively through the pipe 131, passage 132, pipe 92 and passage 94 to the sump 74. Accordingly, pressure does not exist in the pipe 92 leading to the range stem 61 and pressure does not exist in the pipe 131 so that the regulating valve piston 136 is held in the position shown in FIG. 2 by the spring 137 wherein the piston 136 masks the inlet port 133 and uncovers the sump port 140.

As for the pressure regulating valve 149, the pistons 153 and 154 are held in the spaced positions also shown in FIG. 2 by the spring 155 since any pressure hitherto acting against the piston 154 has been freely discharged through the port 159 by opening of the ball valve 158 to the pipe 143 and the pressure hitherto acting against the piston 153 has been released through the pipe 143, the latter then being in communication through the cylinder 135 with the sump port 140.

Figure 3:
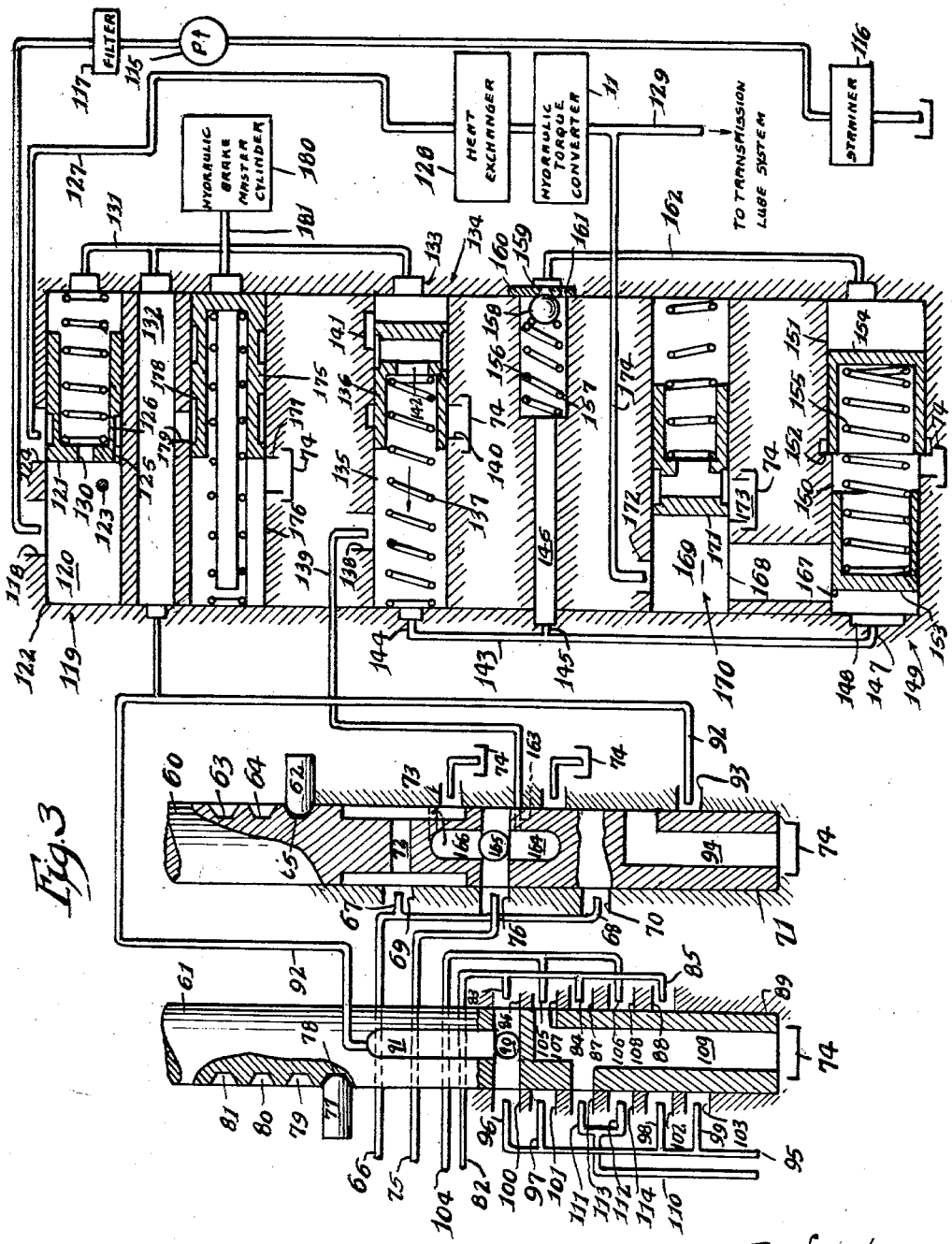
FIG. 3 is a view similar to FIG. 2, but showing the master selector valve shifted to a position determining reverse drive through the transmission then in first speed and under a steady running condition.

Considering the initiation of a movement of the vehicle in reverse direction with the range stem 61 in first speed position (notch 78), the direction stem 60 is moved to engage the detent 62 with the notch 65 as shown in FIG. 3 to which reference will now be made. It will be understood, however, that FIG. 3 shows a steady running condition with the several pressure regulating valves in final positions for determining the corresponding regulated pressures, but certain controls are exercised by these valves prior to reaching the indicated positions.

The movement of the direction stem to reverse position does not affect the released condition of the forward clutch 15 since the pipe 66 connected to the cylinder 17 thereof still communicates through the passage 72 with the sump port 73. However, with the masking of the port 93 by the direction stem 60, pressure oil begins flowing through the pipe 92 to the cylinders 36 and 51 of the first speed clutches 38 and 53, respectively, and this flow is sufficient to take up the clearance between the plates of the latter clutches. The pressure oil is also active against the regulating valve piston 136 through the port 133, but until the plates of the clutches 38 and 53 contact, the oil pressure is relatively low and unable to shift the piston 136 any appreciable distance from the position shown in FIG. 2.

Further, the delivery end of the pipe 139 now registers with a passage 163 which successively communicates through a channel passage 164 and radial passages 165 with the port 76 and hence with the pipe 75 leading to the cylinder 25 of the reverse clutch 23, the passages 163, 164 and 165 being located in the direction stem 60. This connection does not immediately supply pressure oil to the reverse clutch 23 because the valve piston 136 still unmasks the sump port 140 and communication has not yet been established between the inlet port 133 and the cylinder 135 with which the pipe 139 connects.

With the plates of the first speed clutches 38 and 53 in contact, pressure begins rising in the above identified supply pipes and passages leading to the cylinders 36 and 51, respectively, of the last named clutches and also in the port 133 where it acts against the valve piston 136 and moves the latter towards the left as viewed in FIGS. 2 and 3, this movement being against the sole loading of the spring 137 until the piston 136 has moved a determined distance.

This distance is that which is necessary to connect the inlet port 133 with the cylinder 135 through the passages 141 and 142 and to mask the sump port 140. Pressure oil then begins flowing through the pipe 139 and the above identified pipes and passages leading to the cylinder 25 of the reverse clutch 23 and also to opposite ends of the pressure regulating valve 149 through the manifold pipe 143 and the throttling orifice 161 and pipe 162, respectively. The pressure of this oil is relatively low until the plates of the reverse clutch 23 are in contact and then begins a controlled rise to maximum value as determined by the spring loading on the piston 153 to which is added the oil pressure acting against the piston 154, the rate of this additional loading being controlled by the throttling orifice 161.

From FIG. 3, it will be apparent that the pressure regulating valve 149 is in back pressure relation to the pressure regulating valve 134 so that the pressure regulated by the valve 149 imposes a loading on the pressure regulating valve piston 136 which is additional to that imposed by the spring 137. The maximum engaging pressure for the first speed clutches 38 and 53, generally indicated by the FIG. 3 position of the regulating valve 134, is higher than that for the reverse clutch 23, generally indicated by the FIG. 3 position of the regulating valve 149. Maximum pressure for the first speed clutches 38 and 53 may be of the order of 290 p.s.i. and that for the reverse clutch 23 200 p.s.i., these values being by way of example and not restrictive and respectively applicable to any of the gear train clutches and the forward clutch.

From the foregoing, it will be apparent that a predetermined pressure will be established in the cylinders 36 and 51 of the first speed clutches 38 and 53, respectively, before pressure oil is admitted to the cylinder 25 of the reverse clutch 23. Thereafter, pressures to the several clutches being engaged rise simultaneously and under a precise control which delays rise from a relatively low to the maximum value.

If, with the range stem 61 in the first speed position as shown, the direction stem 60 is shifted from reverse to engage the detent 62 with the forward notch 63, this shift is through the neutral position of the transmission in which the several parts are in the relations shown in FIGS. 1 and 2, all clutches being released including those heretofore engaged, namely, the reverse clutch 23 and the first speed clutches 38 and 53. In the forward position of the direction stem 60, the delivery end of the pipe 139 registers with a passage 166 in this stem and so communicates successively through the passages 164 and 165 and the port 70 with the branch 68 of the manifold pipe 66 leading to the cylinder 17 of the forward clutch 15. In this position of the stem 60, the port 69 is masked by this stem. Control on the pressure for the forward clutch 15 and the first speed clutches 38 and 53 then proceeds as above.

For successive speed shifts, after first speed and with the stem 60 conditioned for reverse drive as shown in FIG. 3 and considering second speed, the range stem 61 is moved to engage the detent 77 with the notch 79 and thus register the radial passages 90 with the ports 101 and 107. This movement registers the sump passage 109 with the port 87 to release the pressure in the pipe 82 and hence the pressure for the clutch 38. However, in this shifted position of the range stem 61, the clutch cylinder 51 retains connection with the supply pipe 92 through the radial passages 90, but since these passages also now connect with the pipe 104 leading to the empty cylinder 37 of the clutch 40, the oil rushing to the cylinder 37 drops the pressure in the cylinder 51 and also in the pipe 92. With a decrease in pressure in the pipe 92, the spring 137 returns the regulating valve piston 136 to the position shown in FIG. 2 in which it uncovers the sump port 140 so that the reverse clutch 23 is released.

With the registration of the radial passages 90 with the ports 101 and 107 and since the port 93 is masked by the reverse drive position of the direction stem 60, pressure again begins rising in the pipe 92 for application to the second speed clutches 40 and 53 through the pipes 104 and 95, respectively, and the operation thereafter is reference may be made for further details.

Also with the direction stem 60 in reverse drive position, it will be apparent from FIG. 3 that, due to the manifold arrangements of the pipes 82, 95, 104 and 110 in relation to the associated ports, respectively, that successive shifts to third and fourth speed positions will not only reduce the pressure to one of the hitherto engaged gear train clutches and release the pressure to the other hitherto engaged gear train clutch and the direction clutch, but will provide for a controlled pressure rise for all clutches about to be engaged. The same considerations apply to speed shifts when the direction stem 60 is in forward drive position.

The capability of generally releasing all hitherto engaged clutches, including gear train and direction, when either a change in direction or a speed shift is made or both of these changes are effected, insures that the clutches to be engaged have, at the instant of change, either zero pressure application or a substantially reduced pressure application where a particular gear train clutch is to be re-engaged. This conditioning enables the clutches to be engaged to achieve this result without appreciable shock due to the provision for controlling pressure rise.

The transmission also includes two auxiliary features relating to the maintenance of a basic working pressure in the converter 11 and the use of the working oil discharge therefrom for lubrication, and a capability for releasing the pressure to all engaged clutches in the event of a braked stop of the vehicle.

Referring to FIG. 3 which shows the steady running condition, the pressure regulating valve 149 includes an outlet port 167 through which the oil relieved by the valve 149 passes to an inlet port 168 and thence to a cylinder 169 forming part of a pressure regulating valve 170 which otherwise includes a spring loaded piston 171 movable in the cylinder 169 and outlet and sump connecting ports 172 and 173, respectively. It will be apparent that the regulating valve 170 will establish in the outlet port 172 a determined pressure which through the pipe 174 is applied to the pipe 129.

In the event of a brake stoppage of the vehicle, provision is made for quickly releasing the pressure in the pipe 131 which is the main pressure line for all clutches by means allied with the master brake cylinder of the vehicle. A spring loaded piston 175 is movable in a cylinder provided in the casing 122 and is biased to a position uncovering a port 177 connecting the sump 74 with the cylinder 176. An annular channel 178 is recessed in the periphery of the piston 175 and in any position of the latter registers with a port 179 communicating with the passage 132, the pressure in the latter always being the same as that in the pipe 131.

The conventional, master brake cylinder 180 is tapped by a pipe 181 whose opposite end is related to the head of the piston 175. Hence, when the vehicle brakes are applied in the well known way, the pressure rise in the cylinder 180 is also effective against the piston 175 to move the same to connect the ports 179 and 177 through the channel 178 and thus release the pressure in the passage 132 and accordingly that for the engaged clutches.

I claim:

1. In a power transmission including a master, hydraulically actuated, friction plate clutch arranged for connection to a power source, a plurality of constant mesh, gear trains having respectively different speed ratios and connection with the output of the master clutch and a load shaft, and a plurality of hydraulically actuated, friction plate clutches associated with the gear trains, the combination of a source of liquid pressure, a first selector valve for connecting and disconnecting the liquid pressure source with and from the master clutch, a second selector valve movable to connect the liquid pressure source with selected gear train clutches to establish a selected speed ratio when the first selector valve is in connecting position, means for releasing all gear train clutches when the first selector valve is in disconnecting position, means for releasing the master clutch when the first selector valve is in connecting position and the second selector valve is moved from one speed ratio position to another, pressure regulating valve means for regulating the source pressure between a relatively low value when all clutches are released and a maximum value when the master and selected gear train clutches are fully engaged, means for delaying rise of the source pressure from the low to maximum value for the master and selected gear train clutches, and means for establishing a predetermined, less than maximum pressure for the selected gear train clutches prior to the beginning of pressure rise for the master clutch.

2. A combination as defined in claim 1 wherein spring means is provided to load the pressure regulating valve means against the source pressure to establish the relatively low pressure, and means actuated by the source pressure to further load the spring means to delay said rise of source pressure including means for determining the rate of such further loading.

3. A combination as defined in claim 2 wherein the pressure which further loads the spring means is freely discharged through a valve normally biased to a closed position when selectively the first selector valve is moved to a disconnecting position and the second selector valve is moved from one speed ratio position to another.

4. A combination as defined in claim 1 wherein the source pressure regulation is provided by first and second, pressure regulating valves for respectively determining the pressure applied to the master and selected gear train clutches, the first pressure regulating valve being arranged in back pressure relation to the second pressure regulating valve, springs loading each of the valves against the source pressure, means actuated by the source pressure for further loading the first pressure regulating valve spring to delay rise of the source pressure from the low to maximum value for the master and selected gear train clutches including means for determining the rate of such further loading, and means for establishing a predetermined, less than maximum pressure for the selected gear train clutches prior to the begining of pressure rise for the master clutch.

5. A combination as defined in claim 4 wherein the pressure which further loads the first pressure regulating valve spring is freely discharged through a valve normally biased to a closed position when selectively the first selector valve is moved to disconnecting position and the second selector valve is moved from one speed ratio position to another.

6. A combination as defined in claim 4 wherein the second pressure regulating valve establishes a higher source pressure for the selected gear train clutches than the first pressure regulating valve establishes for the master clutch.

7. In a power transmission including input clutches comprising a forward, hydraulically actuated, friction plate clutch arranged for connection to a power source and a reverse, hydraulically actuated, friction plate clutch having its input connected to the power source, a plurality of constant mesh, gear trains having respectively different gear ratios and connections with the outputs of the input clutches, respectively, and with a load shaft, and a plurality of hydraulically actuated, friction plate clutches associated with the gear trains, the combination of a source of liquid pressure, a first selector valve having positions selectively connecting the input clutches with the liquid pressure source and a position disconnecting the last named clutches from the liquid pressure source, a second selector valve movable to connect the liquid pressure source with selected gear train clutches to establish a selected gear ratio when the first selector valve is in one of its connecting positions, means for releasing all gear train clutches when the first selector valve is in disconnecting position, means for releasing the engaged input clutch when the first selector valve is in the corresponding connected position and the second selector valve is moved from one gear ratio position to another, pressure regulating valve means for regulating the source pressure between a relatively low value when all clutches are released and a maximum value when one of the input and selected gear train clutches are fully engaged, means for delaying rise of the source pressure from the low to maximum value for said one input and selected gear train clutches, and means for establishing a predetermined, less than maximum pressure for the selected gear train clutches prior to the beginning of pressure rise for the input clutch to be engaged.

8. A combination as defined in claim 7 wherein the source pressure regulation is provided by first and second, pressure regulating valves for respectively determining the pressure applied to the selected input and gear train clutches, the first pressure regulating valve being arranged in back pressure relation to the second pressure regulating valve, springs loading each of the regulating valves against the source pressure, means actuated by the source pressure for further loading the first pressure regulating valve spring to delay rise of the source pressure from the low to maximum value for the selected input and gear train clutches including means for determining the rate of such further loading, and means for establishing a predetermined, less than maximum pressure for the selected gear train clutches prior to the beginning of pressure rise for the input clutch to be engaged.

9. A combination as defined in claim 8 wherein the pressure which further loads the first pressure regulating valve spring is freely discharged through a valve normally biased to a closed position when selectively the first selector valve is moved to disconnecting position and the second selector valve is moved from one speed ratio position to another.

10. A combination as defined in claim 8 wherein the second pressure regulating valve establishes a higher source pressure for the selected gear train clutches than the first pressure regulating valve establishes for the selected input clutch.

11. A power transmission comprising an input shaft arranged for connection to a power source, an output shaft for connection with a load, and means for coupling the shafts including in order of power flow a first hydraulically actuated, friction plate clutch and a plurality of hydraulically actuated, friction plate clutches having constant mesh gearing connection with the output of the first clutch and with the output shaft, a source of liquid pressure, separate means for connecting and disconnecting the pressure source with and from the first clutch and with and from a selected number of the gear train clutches, respectively, to provide varying speeds of the output shaft, pressure regulating valve means for respectively regulating the liquid supply pressure between a relatively low value when all clutches are released and a maximum value when the first and selected gear train clutches are fully engaged, means for delaying rise of the source pressure from the low to maximum value for the first and selected gear train clutches, and means for establishing a predetermined, less than maximum pressure for the selected gear train clutches prior to the beginning of pressure rise for the first clutch.

12. A power transmission comprising an input shaft arranged for connection to a power source, an output shaft for connection with a load, means for coupling the input and output shafts to provide varying speeds of the latter including in order of power flow an input, hydraulically actuated, friction plate clutch carried by the input shaft, a first intermediate shaft, a pair of speed range, hydraulically actuated, friction plate clutches carried by the first intermediate shaft, a second intermediate shaft, a speed range, hydraulically actuated, friction plate clutch carried by the second intermediate shaft, constant mesh, gear means connecting the input and first intermediate shafts when the input clutch is engaged, separate gear means providing selective and variant speed ratio connections between the first and second intermediate shafts dependent upon which one of said pair of clutches is engaged, other gear means providing a connection between the second intermediate and output shafts when the second intermediate shaft clutch is engaged, a source of liquid pressure connectible with the several clutches to engage the friction plates thereof, separate means for connecting and disconnecting the pressure source with and from the input clutch and simultaneously with and from a selected, first intermediate shaft clutch and the second, intermediate shaft clutch, pressure regulating valve means for respectively regulating the liquid supply pressure between a relatively low value when all clutches are released and a maximum value when the input and selected gear train clutches are fully engaged, means for delaying rise of the source pressure from the low to maximum value for the input and selected gear train clutches, and means for establishing a predetermined, less than maximum pressure for the selected gear train clutches prior to the beginning of pressure rise for the input clutch.

References Cited by the Examiner
UNITED STATES PATENTS

| | | | |
|---|---|---|---|
| 2,712,245 | 7/55 | Lee | 74—364 |
| 3,042,165 | 7/62 | Yokel. | |
| 3,101,012 | 8/63 | Christenson. | |

DON A. WAITE, *Primary Examiner.*